March 17, 1931.    C. B. DOUNCE    1,796,706
FUEL MIXER
Filed Feb. 11, 1929
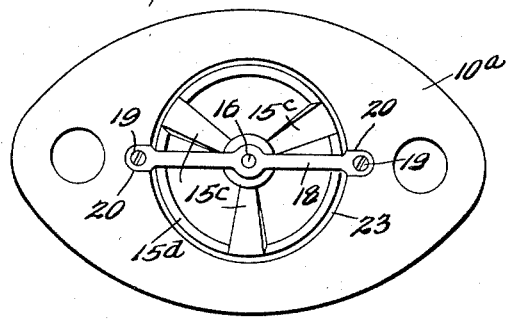
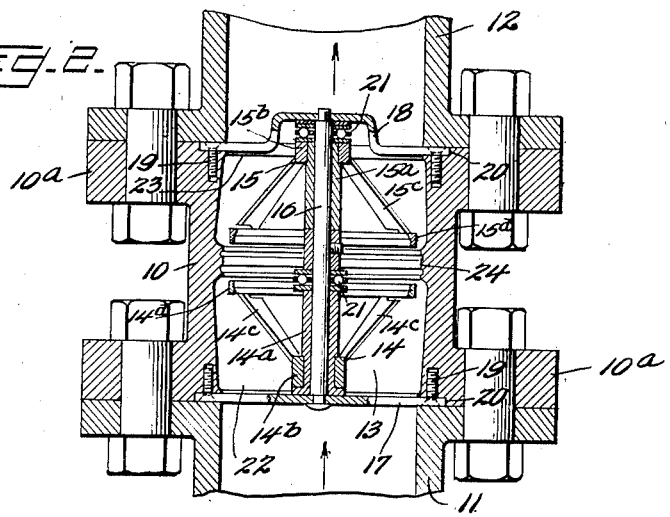
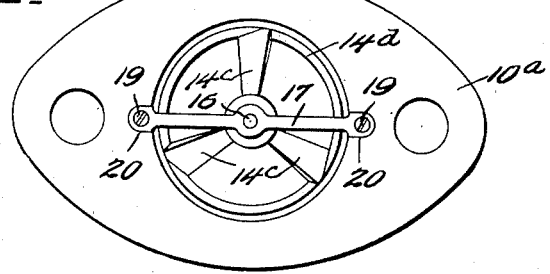
Inventor
C. B. Dounce,
By Watson, Coit, Morse + Grindle
Att'ys Patented Mar. 17, 1931

1,796,706

UNITED STATES PATENT OFFICE

CLIFFORD B. DOUNCE, OF WAVERLY, NEW YORK

FUEL MIXER

Application filed February 11, 1929. Serial No. 339,210.

My invention relates to a fuel mixing device for use particularly with an internal combustion engine, the device being placed between the carburetor and manifold of the engine and serving to produce a thorough agitation and mixing of the air and fuel as they pass toward the engine.

Generally, the invention has for its object the provision of a freely rotatable fan member mounted in the inlet passage of the engine and provided with blades which are arranged diagonally to the axis of rotation of the fan member, the blades being pitched so that the fan member is caused to rotate by passage of the air and gas therethrough. More specifically, the invention aims to provide two fan members of the kind described arranged in a casing and having their blades so pitched as to rotate in oppsite directions, the blades of the first or lower fan member being so arranged that they will tend to throw the gas or mixture outwardly against the wall of the casing and the second or upper fan member being oppositely arranged so that they will tend to draw the gas or mixture inwardly toward the axis of the passage, the result being a very thorough mixing of the air and fuel.

The accompanying drawing, forming a part hereof, illustrates an embodiment of the invention and in said drawing:

Figure 1 is a top plan view of the device detached from other parts;

Figure 2 is a vertical section of the device shown in combination with conduits leading to and from the same;

Figure 3 is a bottom plan view of the device detached from other parts; and

Figure 4 is an enlarged vertical section of a portion of the device.

Referring to the drawings in detail by means of the reference characters thereon, the numeral 10 indicates a casing having perforated flanges 10a by which it can be secured in position between the carburetor and manifold of an engine. As illustrated, the lower flange of the casing 10 is bolted to a conduit 11 leading from the carburetor and the upper flange bolted to a conduit 12 leading to the engine manifold.

Extending through the casing 10 is an opening 13 and within this opening are arranged two fan members 14 and 15. These fan members are arranged to rotate on a rod 16 extending longitudinally through the opening 13 substantially on the axis thereof, the rod 16 at its ends being mounted in narrow straps 17 and 18, each of which extends transversely of the opening 13 and the ends of which are secured by means of screws 19 in suitable notches 20 formed in the casing 10 adjacent the opening 13.

As illustrated, the lower fan member 14 includes a sleeve 14a rotatable upon the rod 16, a collar 14b surrounding and secured to said sleeve, a plurality of blades 14c connected at one end to the collar 14b and at the other end to a ring 14d. The blades 14c extend diagonally to the rod 16, or in other words, diagonally to the axis of rotation of the fan member 14.

The fan member 15 is similarly constructed and consists of a sleeve 15a rotatably mounted on the rod 16, a collar 15b secured to said sleeve, a plurality of blades 15c connected at one end to said collar and at the other end to a ring 15d, the blades 15c also being arranged diagonally to the axis of rotation of the fan member 15.

In order to render the fan members easily rotatable, a ball bearing 21 is arranged adjacent the upper end of the sleeve 14a of the lower fan member and a similar ball bearing is arranged adjacent the upper end of the sleeve 15a of the upper fan member. It will be understood that as the gases are drawn through the device, the fan members will be drawn upwardly against these ball bearings and, consequently will rotate freely. Each blade 14c, 15c is of gradually increasing width from the sleeve to the ring.

The blades 14c of the lower fan member 14 are provided with a suitable pitch or skew so that the flow of the gases through the device will cause rotation of the fan member. The blades 15c of the upper fan member are also provided with a pitch or skew in the opposite direction from that of the blades 14c. The result is that the upward flow of the gas through the device will cause one fan member to rotate in one direction and the other one in the other direction.

As already noted, the blades 14c and 15c are arranged diagonally to the axis of rotation of the fan members 14 and 15. In other words the blades in each fan member extend inwardly toward the central portion of the opening and outwardly toward the wall thereof. The fan members 14 and 15 are arranged on opposite sides of a plane perpendicular to the rod 16 or to the axis of rotation of the fan members. The blades 14c are preferably arranged in a substantially conical formation with the cone of rotation of said blades pointing toward the inlet end of said opening 13. Likewise the blades 15c are preferably arranged in substantially a conical formation, the cone of rotation of such blades pointing toward the outlet end of the opening 13. In other words, the apices of said cones point in opposite directions from the aforementioned perpendicular plane.

It will be noted that the inner surfaces of the rings 14d and 15d are beveled or inclined at substantially the same inclination as the blades 14c and 15c respectively. The rings 14d and 15d, of course, act to reinforce the blades 14c and 15c against outward movement under the action of fuel and centrifugal force.

Preferably the opening 13 in the member 10 is formed so that the inlet portion thereof, indicated at 22, will gradually increase in diameter from the inlet end to a point substantially opposite the ring 14d. Likewise the outlet portion of this opening indicated at 23, is of gradually increasing diameter from the outlet end thereof inwardly to a point substantially opposite the ring 15d. Between the portions 22 and 23, the diameter of the opening 13 is substantially the same as it is at each end, the result being that a rib 24 is produced on the inner wall of the opening 13, which rib lies between the rings 14d and 15d and substantially midway between the ends of the opening 13.

The gradual increase in the diameter of the opening 13 from each end inwardly is provided for the purpose of compensating for the material present in the fan members. In other words, the material of the fan members occupies a certain space in the opening 13 and to compensate for this and avoid any throttling action due to the presence of the fan members, the wall of the opening 13 is made of gradually increasing diameter in the manner described. It is so adjusted that at any cross section the total unobstructed area is substantially the same as that of the induction pipe.

It has been found that a device of the kind described is very efficient and adds materially to the power and smoothness of operation of an engine. This is believed to be due to the fact that the blades of the fan members 14 and 15 not only serve to agitate and mix the fuel by reason of their rotation in the current of air and fuel as it passes through the opening 13, but also to the further thorough mixing of the gases due to the fact that as the gases pass the fan member 14, this member has a tendency to throw them outwardly toward the wall of the opening 13 and that as the fuel passes the fan member 15, the opposite action takes place, this fan member tending to draw them inwardly toward the center of the opening.

It will be noted that the rib 24 between the two divergent sections of the opening through the casing 10 joins these sections by curved walls converging inwardly. This arrangement clearly shown in Figure 4 functions to insure complete commingling of any fluid droplets with the air fuel mixture, and further forces these droplets to pass through the blades of at least one fan. Considering the mixture to flow upwardly in Figure 4 it will be seen that any following the walls (and in this position will be found the wettest mixture) will, on meeting the first converging section of the wall adjacent the rib 24, be drawn inwardly so that it must pass between the blades of the upper fan there to be mixed with the air. Any possible condensation on the wall above the rib will run down and be precipitated inwardly by the curved wall at its junction with the rib. The flange shown at 15d in Figure 4 further serves to deflect the outer layers of mixture inwardly and into the fan blades. The whole arrangement is such that the mixture delivered from the casing is as near uniform in the distribution of its constituents as it is possible to make it without the addition of external power which is of course undesirable.

My device is capable of use in any relation where fuel mixing is desired and changes may, of course, be made in the details of the structure as above described, within the scope of the appended claims and without departing from the spirit of the invention.

Having thus described the invention, what is claimed as new and desired to be secured by Letters Patent is:

1. A fuel mixing device comprising in combination a casing having a substantially circular opening extending directly therethrough, a fan member mounted in said opening and arranged to freely rotate under action of moving gases about an axis substantially coincident with the axis of said opening, said fan member having at least three pitched blades inclined to said axis of rotation in a substantially conical formation, each of said blades extending from a point adjacent said axis of rotation outwardly to a point adjacent the wall of said opening.

2. A fuel mixing device comprising in combination a casing having a substantially circular opening therethrough, a fan member mounted in said opening and arranged to freely rotate about an axis substantially coincident with the axis of said opening, said fan member having a plurality of pitched blades each arranged diagonally to said axis of rotation and extending from a point adjacent said axis of rotation outwardly toward the wall of said opening and a ring connecting the outer ends of said blades.

3. A fuel mixing device comprising in combination a casing having a substantially circular opening therethrough, a fan member mounted in said opening and arranged to freely rotate about an axis substantially coincident with the axis of said opening, said fan member having a plurality of pitched blades each arranged diagonally to said axis of rotation and extending from a point adjacent said axis of rotation outwardly toward the wall of said opening and a ring connecting the outer ends of said blades and arranged in proximity to the wall of said opening, said opening being of gradually increasing diameter from a point substantially opposite the inner ends of said member to a point opposite said ring.

4. A fuel mixing device for an internal combustion engine comprising in combination, a casing having a substantially circular opening therethrough, two fan members mounted in said opening and arranged to freely rotate about an axis substantially coincident with the axis of said opening, said fan members being arranged on opposite sides of a plane perpendicular to the axis of said opening, each of said fan members including a ring arranged adjacent said plane and a plurality of pitched blades connected to each ring and extending in a direction away from said plane and diagonally inwardly toward the axis of said opening.

5. A fuel mixing device comprising in combination, a casing having a substantially circular opening therethrough, two fan members mounted in said opening and arranged to freely rotate about an axis substantially coincident with the axis of said opening, said fan members being arranged on opposite sides of a plane perpendicular to the axis of said opening, each fan member having a plurality of pitched blades inclined to said axis of rotation in a substantially conical formation, the blades of one of said fan members being pitched oppositely from those in the other fan member, whereby said fan members rotate in opposite directions, the cones of rotation of said blades on opposite sides of said plane having their apices pointed away from said plane, each of the blades of said fan members extending from a point adjacent the axis of rotation of said fan members outwardly to a point adjacent the inner wall of said opening.

6. A construction as defined in claim 4 in which the wall of said opening on each side of said plane is of gradually increasing diameter from a point opposite the inner ends of said blades to a point opposite said ring.

7. A fuel mixing device for an internal combustion engine comprising in combination, a casing having an opening therethrough, a fan mounted in said opening and adapted to be rotated by the passing fuel about an axis substantially coincident with the axis of said opening, said fan having pitched blades, each arranged at a sharp angle to the axis of rotation and extending from a point adjacent said axis of rotation outwardly toward the wall of said opening and means reinforcing said blades against outward movement under the action of the fuel and centrifugal force.

8. A fuel mixing device for an internal combustion engine, comprising in combination, a casing having a substantially circular opening therethrough, two fans in said opening rotatable about an axis coincident to the axis of the opening, said fans being on opposite sides of a plane perpendicular to the axis of the opening, each fan having pitched blades arranged diagonally to the axis in a substantially conical formation, a ring for each fan connecting the outer ends of the blades, said rings being adjacent each other, the opening on each side of said plane being of gradually increasing diameter from a point substantially opposite the apex of the cone of rotation of the blades inwardly to a point substantially adjacent the ring of the fan, the wall of the opening converging from these maximum diameters to a less diameter between the rings for the purpose described.

9. A construction as specified in claim 5, in which said casing is provided with an internal annular rib arranged between said fan members and extending inwardly from the wall thereof and serving to deflect inwardly the fuel passing through said casing.

10. A fuel mixing device comprising in combination, a casing having a substantially circular opening extending directly therethrough, a plurality of fan members mounted in said opening and arranged to freely rotate under action of moving gases about an axis substantially coincident with the axis of said opening, each of said fan members having at least three pitched blades inclined to said axis of rotation in substantially conical formation, each of said blades extending from a point adjacent said axis of rotation outwardly to a point adjacent the wall of said opening.

In testimony whereof I hereunto affix my signature.

CLIFFORD B. DOUNCE.